US009147898B2

(12) United States Patent
Darling

(10) Patent No.: US 9,147,898 B2
(45) Date of Patent: Sep. 29, 2015

(54) CONTROL SYSTEM FOR A SEALED COOLANT FLOW FIELD FUEL CELL POWER PLANT HAVING A WATER RESERVOIR

(75) Inventor: Robert M. Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/131,078

(22) PCT Filed: Aug. 11, 2011

(86) PCT No.: PCT/US2011/047386
§ 371 (c)(1),
(2), (4) Date: Jan. 6, 2014

(87) PCT Pub. No.: WO2013/022450
PCT Pub. Date: Feb. 14, 2013

(65) Prior Publication Data
US 2014/0162152 A1 Jun. 12, 2014

(51) Int. Cl.
*H01M 8/04* (2006.01)
*H01M 8/10* (2006.01)
(52) U.S. Cl.
CPC ........ *H01M 8/04126* (2013.01); *H01M 8/0485* (2013.01); *H01M 8/04156* (2013.01); *H01M 8/04171* (2013.01); *H01M 8/04492* (2013.01); *H01M 8/04522* (2013.01); *H01M 8/04619* (2013.01); *H01M 8/04723* (2013.01); *H01M 8/04753* (2013.01); *H01M 8/04828* (2013.01); *H01M 8/04835* (2013.01); *H01M 8/04843* (2013.01); *H01M 2008/1095* (2013.01); *Y02E 60/50* (2013.01)

(58) Field of Classification Search
CPC .................... H01M 8/04828; H01M 8/04843; H01M 8/0485; H01M 8/04835
See application file for complete search history.

(56) References Cited

U.S. PATENT DOCUMENTS

| 6,376,111 B1 * | 4/2002 | Mathias et al. ............... 429/413 |
| 2004/0081863 A1 * | 4/2004 | Nomoto .......................... 429/13 |
| 2005/0112430 A1 | 5/2005 | Nuttall et al. |
| 2010/0068568 A1 | 3/2010 | Darling |
| 2010/0119899 A1 * | 5/2010 | Usami ............................. 429/22 |
| 2010/0330448 A1 | 12/2010 | Perry et al. |

FOREIGN PATENT DOCUMENTS

WO 2008/142564 A1 11/2008

OTHER PUBLICATIONS

Extended European Search Report, mailed Mar. 5, 2015, for European Application No. 11870786.8-1359/2742555, 7 pages.

* cited by examiner

*Primary Examiner* — Zachary Best
(74) *Attorney, Agent, or Firm* — Seed IP Law Group PLLC

(57) ABSTRACT

The system (10) controls at least one of a pressure of the reactant streams (16A, 16B) within at least one of an anode flow field (28) and a cathode flow field (36), a flow rate of the reactant streams (16A, 16B) flowing through the anode and/or cathode flow fields (26, 28), a temperature of a coolant fluid passing through a sealed coolant flow field (44), and a flow rate of the coolant fluid; so that water (14) moves from a water reservoir (18A, 18B) into the reactant stream (16A, 16B) whenever power generated by the fuel cell (20) is between about 80% and about 100% of a maximum fuel cell power output, and so that water (14) moves from the reactant stream (16A, 16B) into the water reservoir (18A, 18B) whenever fuel cell power is less than about 75% of the maximum power output.

10 Claims, 3 Drawing Sheets

CONTROL SYSTEM FOR A SEALED COOLANT FLOW FIELD FUEL CELL POWER PLANT HAVING A WATER RESERVOIR

TECHNICAL FIELD

The present disclosure relates to fuel cells that are suited for usage in transportation vehicles, portable power plants, or as stationary power plants, and the disclosure especially relates to a system and method for controlling relative humidity within reactant streams passing through a fuel cell.

BACKGROUND ART

Fuel cells are well known and are commonly used to produce electrical current from a hydrogen-rich fuel stream and an oxygen-containing oxidant stream to power electrical apparatus. Fuel cells are typically arranged in a cell stack assembly having a plurality of fuel cells arranged with common manifolds and other components such as controllers and valves, etc. to form a fuel cell power plant. Many such power plants utilize a "membrane electrode assembly" ("MEA") that includes a "proton exchange membrane" ("PEM") as an electrolyte secured between opposed anode and cathode catalysts and support materials.

In such a fuel cell power plant of the prior art, it is well known that many difficulties are associated with long-term operation of the plant. In particular, fuel cell power plants that include a coolant system that directs a coolant fluid through a sealed coolant flow field in thermal exchange with the MEA to remove heat generated during operation of the fuel cells must carefully control a relative humidity of reactant gas streams passing adjacent the MEA indirectly by controlling the temperature of the reactant gases. (For purposes herein a "sealed coolant flow field is to mean that fluids cannot pass between the coolant flow field and adjacent fuel cell components.) If the relative humidity is too high, water generated at the cathode catalyst during operation of the cell will accumulate as a liquid instead of evaporating into the reactant stream. This produces flooding which slows down or completely interrupts flow of the reactant stream and results in poor or disrupted fuel cell operation.

In contrast if the relative humidity of the reactant streams is too low, moisture within the PEM electrolyte within the MEA will evaporate into the reactant streams resulting in drying of the PEM. This slows transfer of protons through the PEM which in turns interferes with electricity production. Drying of the PEM also results in deterioration of the PEM so that gaseous reactant breakthrough of torn or disrupted membranes is possible. This not only deteriorates fuel cell performance, but also poses a risk of mixing of reactant gases that could lead to combustion of the gasses.

Consequently, there is a need for a fuel cell power plant having sealed coolant flow fields that efficiently maintains relative humidity of reactant streams passing through fuel cells of the plant.

SUMMARY

The disclosure is directed to a control system for a fuel cell power plant for generating electrical current from oxidant and hydrogen-rich fuel reactant streams. The system controls movement of water out of a reactant stream within a fuel cell and into a water reservoir whenever the relative humidity of the reactant stream is greater than 1.00. Whenever the reservoir is full at which point excess water exits the cell. (Relative humidity of "1.00" means one-hundred percent of the capacity of the reactant stream to hold gaseous water is utilized.) Whenever the relative humidity of the reactant stream is less than 1.00, the system controls movement of water out of the water reservoir and into the reactant stream and PEM (proton exchange membrane electrolyte) within the fuel cell. Additionally, the control system coordinates the relative humidity of the reactant stream with the power output of the fuel cell. In particular, water in the form of water vapor moves from the water reservoir into the reactant stream whenever power generated by the fuel cell is between about eighty percent and about one-hundred percent of a maximum power output of the fuel cell. And, water moves from the reactant stream into the available (empty) volume of the water reservoir whenever power produced by the fuel cell is less than about seventy-five percent of the maximum power output of the fuel cell. (For purposes herein, the word "about" is to mean plus or minus ten percent).

The control system includes at least one fuel cell including a membrane electrode assembly ("MEA") having a proton exchange membrane ("PEM") disposed between an anode catalyst surface and an opposed cathode catalyst surface. An anode flow field is defined in fluid communication with the anode catalyst surface and with a fuel inlet line for directing flow of the hydrogen-rich fuel reactant stream from the fuel inlet line adjacent the anode catalyst surface and out of the anode flow field through an anode exhaust as an anode exhaust stream. A cathode flow field is also defined in fluid communication with the cathode catalyst surface and with a source of the oxidant for directing flow of the oxidant stream from an oxidant inlet line adjacent the cathode catalyst and out of the cathode flow field through a cathode exhaust as a cathode exhaust stream.

A sealed coolant flow field is secured in thermal exchange relationship with at least one of the anode and the cathode flow fields for directing a coolant fluid from an inlet of a coolant loop through the coolant flow field and out of the flow field through an outlet of the coolant loop. The coolant loop includes a coolant loop pump, a coolant loop flow rate controller, and a coolant loop heat exchanger for controlling a temperature of the coolant fluid within the coolant flow field. Additionally, a water reservoir is secured in fluid communication with at least one of the anode flow field and the cathode flow field and is secured in fluid isolation from the sealed coolant flow field. The water reservoir is configured for moving water out of the reservoir and into the reactant stream passing through the at least one anode and cathode flow fields, and for moving water out of the reactant stream passing through the at least one anode and cathode flow fields and into the reservoir.

A relative-humidity sensor is secured in communication with the reactant stream passing through at least one of the anode flow field and the cathode flow field. A relative-humidity controller is also secured in communication between the relative-humidity sensor and at least one of: a fuel inlet valve secured to the fuel inlet line; an oxidant inlet valve secured to the oxidant inlet line; an oxidant blower secured to the oxidant inlet line; an anode exhaust valve secured to the anode exhaust; a cathode exhaust valve secured to the cathode exhaust; the coolant loop pump; coolant loop flow rate controller; and, the coolant loop heat exchanger. The relative humidity sensor may also be a relative humidity sensor means for determining a relative humidity of at least one of the reactant streams passing through the at least one of the anode flow field and the cathode flow field. Therefore, the relative humidity sensor means may be an apparatus for sensing relative humidity, or may be any apparatus or combinations of apparatus capable of performing the described function, such as sensors measuring fuel cell operating parameters, and using the sensed measurements to calculate the relative humidity of at least one of the reactant streams.

The relative-humidity controller is configured to selectively control at least one of: a pressure of the reactant streams; a flow rate of the reactant streams; a temperature of the coolant in the sealed coolant flow field; a flow rate of the coolant fluid passing through the sealed coolant flow field; so that water moves from the water reservoir into the reactant stream and PEM whenever power generated by the fuel cell is between about eighty percent and about one-hundred percent of a maximum power output of the fuel cell, and so that water moves from the reactant stream or PEM into the water reservoir whenever power produced by the fuel cell is less than about seventy-five percent (75%) of the maximum power output of the fuel cell as long as reservoir volume is available. In an alternative embodiment, the control system may include a de-rate power function if the reservoir becomes exhausted while operating above 80% of the maximum power output of the fuel cell. In a preferred embodiment, the water reservoir includes pores defined in or adjacent to a separate porous body secured in fluid communication with at least one of the anode and the cathode flow fields.

In operation of the control system, as demand for electricity increases by a load, such as by an electric motor of a transportation vehicle, current density generated by the fuel cell increases and therefore heat generation increases in the MEA (membrane electrode assembly) causing the temperature to rise in the MEA and within the flow fields. This increased temperature causes the relative humidity within the reactant streams to decline, which results in water held in the water reservoir evaporating into the reactant streams to increase the relative humidity. The relative-humidity controller is configured to maintain the relative humidity of the reactant streams within at least one of the anode and cathode flow fields to be greater than 1.00 until the power output of the fuel cell reaches about seventy-five percent of the maximum power output of the fuel cell. While the relative humidity of the reactant streams is greater than 1.00, water produced by the fuel cell moves into the water reservoir until it is full, and excess water is removed from the fuel cell within the cathode exhaust stream. As the fuel cell power output increases to between about eighty percent and one-hundred percent of the maximum potential power output, the temperature increases and the relative humidity decreases so that water held in the water reservoir evaporates into the reactant streams.

This evaporation of water held within the water reservoir also aids in cooling the reservoir and the adjacent MEA. The higher relative humidity and evaporative cooling of the reactant streams will also allow operating the fuel cell power plant with a higher coolant exit temperature at a high current density. This will decrease a parasitic power demand on the fuel cell power plant to cool itself and reduce radiator size. Additionally, operating the fuel cells at a maximum relative humidity at low current output can be controlled by changing oxidant reactant stream flow rates, reactant stream pressures, etc. to prevent flooding by excess water.

The water reservoir defines an adequate volume to retain sufficient water for maintaining the relative humidity of the reactant streams at or about 1.00 during anticipated high power demands placed on the fuel cell. In other words, a particular fuel cell, such as a fuel cell for a transportation vehicle, or a fuel cell for a stationary power plant, will have a predictable duration of a high-power output. The water holding volume defined by the water reservoir is structured to maintain the relative humidity of the reactant streams at or about 1.00 during such predetermined durations of a high-power output. A preferred water holding volume defined by the water reservoir is an adequate volume to maintain the relative humidity of the reactant streams at or about 1.00 for about five minutes. After the predetermined duration of high power output, such as the five minute duration the control system may initiate a de-rate function to return the fuel cell to operating at less than about seventy-five percent (75%) of the maximum power output of the fuel cell. The reservoir or reservoirs of the present control system further assist fuel cell operation by wicking water from reactant flow fields, and generally making water removal easier. The present disclosure also includes methods of operating a fuel cell power plant to maintain efficient relative humidity of reactant streams passing through fuel cells of the power plant as described above, and as described in more detail below.

Accordingly, it is a general purpose of the present disclosure to provide a control system for a sealed coolant flow field fuel cell power plant having a water reservoir that overcomes deficiencies of the prior art.

It is a more specific purpose to provide a control system for a sealed coolant flow field fuel cell power plant having a water reservoir that efficiently maintains optimal relative humidity of reactant streams within fuel cells of the power plant.

These and other purposes and advantages of the present a control system for a sealed coolant flow field fuel cell power plant having a water reservoir will become more readily apparent when the following description is read in conjunction with the accompanying drawings.

DESCRIPTION OF THE PREFERRED EMBODIMENTS

Figure 1:
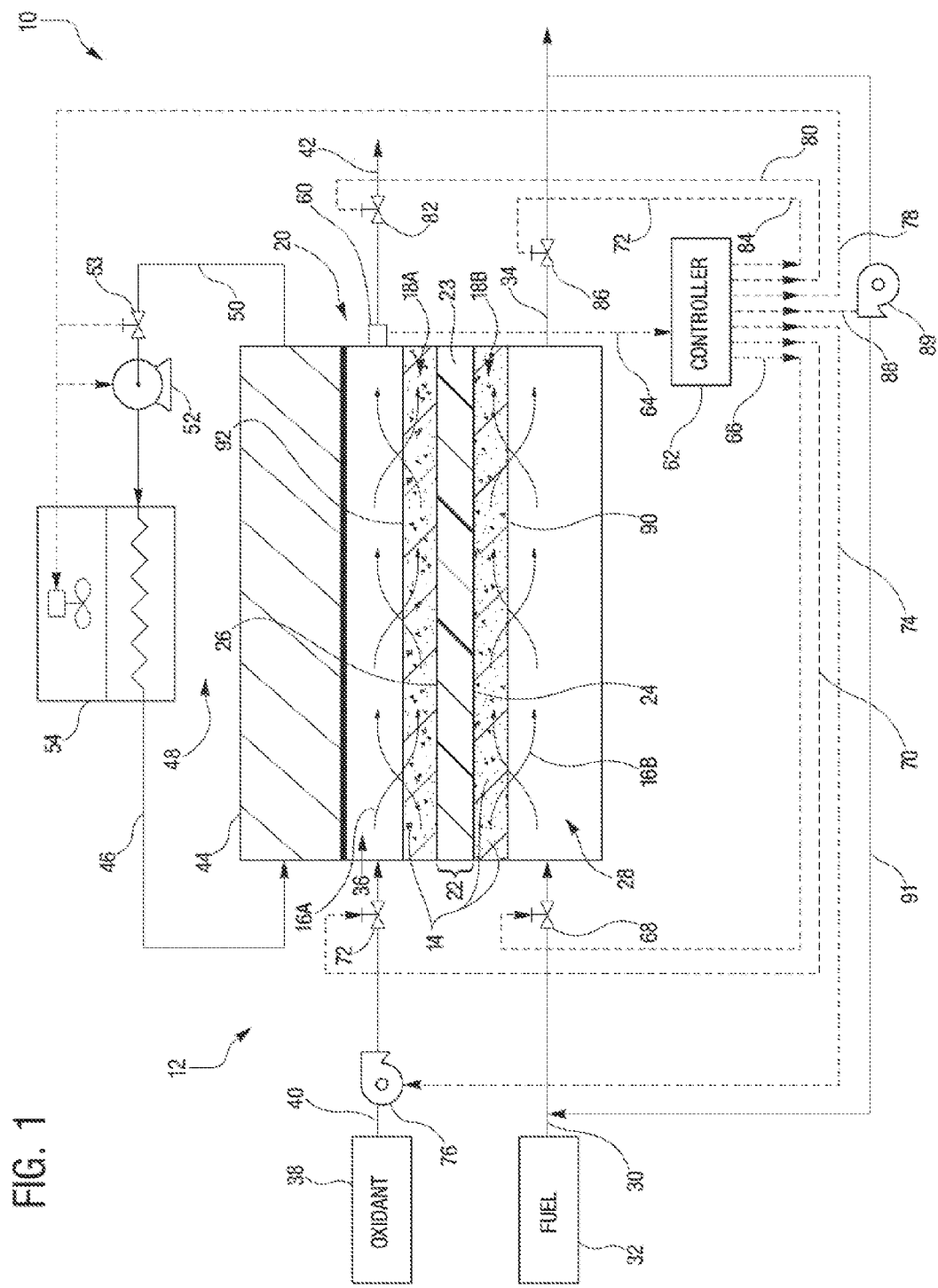
FIG. 1 is a simplified schematic representation of a control system for a sealed coolant flow field fuel cell power plant having a water reservoir of the present disclosure.

Referring to the drawings in detail, a control system for a sealed coolant flow field fuel cell power plant having a water reservoir is shown in FIG. 1 and is generally designated by the reference numeral 10. The system 10 is applied to a fuel cell power plant 12 for generating electrical current from oxidant and hydrogen-rich fuel reactant streams. The system 10 controls movement of water 14 out of a reactant stream 16A, 16B and into a water reservoir 18A, 18B whenever a relative humidity of the reactant stream 16A, 16B is greater than 1.00. (Relative humidity of "1.00" means one-hundred percent of the capacity of the reactant stream 16A, 16B to hold gaseous water is utilized.)

Whenever the relative humidity of the reactant streams 16A, 16B is less than 1.00, the system 10 controls movement of water 14 out of the water reservoir 18A, 18B and into the reactant streams 16A, 16B. Additionally, the control system 10 coordinates the relative humidity of the reactant streams 16A, 16B with a power output of a fuel cell 20. In particular, water 14 moves from at least one of the water reservoirs 18A, 18B into at least one of the reactant streams 16A, 16B whenever power generated by the fuel cell 20 is between about eighty percent and about one-hundred percent of a maximum power output of the fuel cell 20. Water 14 moves from at least one of the reactant streams 16A, 16B into at least one of the water reservoirs 18A, 18B whenever power produced by the fuel cell 20 is less than about seventy-five percent of the maximum power output of the fuel cell 20. (For purposes herein, the word "about" is to mean plus or minus five percent). In a preferred embodiment the fuel cell 20 would be configured so that during 50% of its operating time and preferably during 75% of its operating time, water 14 moves from at least one of the reactant streams 16A, 16B into at least one of the water reservoirs 18A, 18B. The control system 10 and fuel cell 20 would therefore be structured so that the fuel cell 20 produces less than about 75% of its maximum power output during the 50% of its operating time and preferably during 75% of the operating time of the fuel cell 20.

The control system 10 includes at least one fuel cell 20 including a membrane electrode assembly 22 ("MEA") having a proton exchange membrane 23 ("PEM") disposed between an anode catalyst surface 24 and an opposed cathode catalyst surface 26 of the MEA. An anode flow field 28 is defined in fluid communication with the anode catalyst surface 24 and with a fuel inlet line 30 for directing flow of the hydrogen-rich fuel reactant stream from a fuel storage source 32 through the fuel inlet line 30 adjacent the anode catalyst surface 24 and out of the anode flow field 28 through an anode exhaust 34 as an anode exhaust stream. A cathode flow field 36 is also defined in fluid communication with the cathode catalyst surface 26 and with an oxidant source 38 (such as the atmosphere, or an oxidant storage container 38) for directing flow of the oxidant reactant stream from an oxidant inlet line 40 adjacent the cathode catalyst surface 26 and out of the cathode flow field 36 through a cathode exhaust 42 as a cathode exhaust stream.

A sealed coolant flow field 44 is secured in thermal exchange relationship with at least one of the anode flow field 28 and the cathode flow field 36 (as shown in FIG. 1) for directing a coolant fluid from a coolant inlet 46 of a coolant loop 48 through the sealed coolant flow field 44 and out of the flow field 44 through a coolant outlet 50 of the coolant loop 48. The coolant loop 48 also includes a coolant loop pump 52, possibly a coolant flow rate control valve 53 for controlling a flow rate of the coolant fluid passing through the coolant loop 48 and coolant flow field 44, and a coolant loop heat exchanger 54 for controlling a temperature of the coolant fluid passing through the coolant flow field 44.

At least one water reservoir 18A, 18B is secured in fluid communication with at least one of the anode flow field 28 and the cathode flow field 36 and is also secured in fluid isolation from the sealed coolant flow field 44. The water reservoir 18A, 18B is configured for moving water out of the reservoir 18A, 18B and into a reactant stream 16A, 16B located in the at least one anode flow field 28 and cathode flow field 36, and for moving water out of the reactant stream 16A, 16B located in the at least one anode flow field 28 and cathode flow field 36 and into the reservoir 18A, 18B. For example, if the reactant stream is an oxidant reactant stream 16A passing through the cathode flow field 36, the water reservoir 18A secured adjacent the cathode flow field 36 transfers water 14 into and out of the oxidant reactant stream 16A depending upon the relative humidity of the stream 16A. FIG. 1 shows the reservoirs 18A, 18B adjacent opposed surfaces of the MEA 22, however, the reservoirs 18A, 18B may be located in different locations provided they remain in fluid communication with at least one of the reactant streams 16A, 16B.

A relative-humidity sensor 60 may be secured in communication with the reactant stream passing through at least one of the anode flow field 28 and the cathode flow field 36. Preferably the relative-humidity sensor 60 is secured in communication with the cathode exhaust stream within the cathode exhaust 42, as shown schematically in FIG. 1. The relative-humidity sensor 60 may a Sensirion SHT10 available from www.sensirion.com, or any structure known in the art and capable of sensing the relative humidity of a reactant stream 16A, 16B and communicating the sensed relative humidity.

As described above, the relative humidity sensor 60 may also be a relative humidity sensor means 60 for determining a relative humidity of at least one of the reactant streams 16A, 16B passing through the at least one of the anode flow field 28 and the cathode flow field 36. Therefore, the relative humidity sensor means 60 may be an apparatus for sensing relative humidity as described above, or may be any apparatus or combinations of apparatus capable of performing the described function, such as measuring devices (not shown) for measuring fuel cell operating parameters, and for using the sensed measurements to calculate the relative humidity of at least one of the reactant streams.

A relative-humidity controller 62 is also secured in communication with the relative-humidity sensor 60 through a first communication line 64. (By the phrase "communication line", it is meant that described components communicate with each other through any apparatus known in the art, such electric wires, optical fibers, electromagnetic waves, mechanical valves actuated by human operators in response to visual indicia, etc., all of which are represented by the hatched line 64 and other hatched lines described below.) The relative-humidity controller may be any controller means known in the art for performing the described functions, such as for example a computer, electro-mechanical controls, hydraulic controls responding to electro-mechanical or radio wave signals, a human operator responding to visual or audio signals, etc. The relative-humidity controller 62 is also secured in communication with at least one of the following components. The controller 62 may be secured through a second communication line 66, with a fuel inlet valve 68 secured to the fuel inlet line 30; through a third communication line 70 with an oxidant inlet valve 72 secured to the oxidant inlet line 40; through a fourth communication line 74 with an oxidant blower 76 secured to the oxidant inlet line 40; through a fifth communication line 78 with the coolant loop 48 coolant control valve 43, coolant loop pump 52 and/or coolant loop heat exchanger 54; through a sixth communication line 80 with a cathode exhaust valve 82 secured to the cathode exhaust 42; through a seventh communication line 84 with an anode exhaust valve 86 secured to the anode exhaust 34; and, through an eighth communication line 88 with a reactant exhaust gas flow rate controller secured to a reactant exhaust gas recycle line, such as a reactant exhaust gas flow rate controller 89 secured to an anode exhaust gas recycle line 91. The anode recycle line 91 is secured between the anode exhaust 34 and the fuel inlet line 30, and the reactant exhaust gas flow rate controller may be a blower 89, an ejector, or any other apparatus capable of controlling a rate of flow of recycling a fuel cell reactant exhaust gas.

The relative-humidity controller 62 is configured to selectively control at least one of: a pressure of the reactant streams 16A, 16B within the anode flow field 28 and/or the cathode flow field 36; a flow rate of the reactant streams 16A, 16B flowing through the anode flow field 28 and/or the cathode flow field 36; a temperature of the coolant fluid in the sealed coolant flow field 44; a flow rate of the coolant fluid passing through the sealed coolant flow field 44; so that water 14 moves from the water reservoir 18A, 18B into the reactant stream 16A, 16B whenever power generated by the fuel cell 20 is between about eighty percent and about one-hundred percent of a maximum power output of the fuel cell 20, and so that water 14 moves from the reactant stream 16A, 16B into the water reservoir 18A, 18B whenever power produced by the fuel cell 20 is less than about seventy-five percent of the maximum power output of the fuel cell 20.

The relative-humidity controller 62 may control one or more of the aforesaid parameters in response to information received from the relative-humidity sensor 60, or the controller 62 may simply be tuned to control one or more of the parameters in response to other operating characteristics of the fuel cell power plant 12. For example, if the power plant 12 is to serve as a stationary power plant and operate at a near steady-state of current output, the variables primarily effecting relative humidity would be ambient air conditions. Therefore, a relative-humidity sensor 62 apparatus may not be needed, and the fuel cell power plant 12 may be tuned by other relative humidity sensor means described above to produce varying relative humidity of the reactant streams 16A, 16B by other sensed information, or simply in response to fuel cell current output.

In a preferred embodiment, the water reservoir 18A, 18B includes pores defined in a hydrophobic anode porous body 90 secured in fluid communication with the anode catalyst surface 24 of the MEA 22, and pores defined in a hydrophobic cathode porous body 92 secured in fluid communication with the cathode catalyst surface 26 of the MEA 22. An alternative water reservoir 18A or water reservoirs 18A, 18B may include alternative structures (not shown) that are capable of performing the water transfer into and out of the reactant streams 16A, 16B described above, such as hollow fibers, hydrophilic assemblies in the gas diffusion layers.

In operation of the control system 10, as demand for electricity increases by a load (not shown), current density generated by the fuel cell 20 increases and therefore heat produced by the MEA 22 increases and transfers to the anode flow field 28 and the cathode flow field 36 causing temperatures to rise. This increased temperature causes the relative humidity within the reactant streams 16A, 16B to decline, which results in water 14 held in the water reservoir 18A, 18B evaporating into the reactant streams 16A, 16B to increase the relative humidity of the reactant streams 16A, 16B. The relative-humidity controller 62 is configured to maintain the relative humidity of the reactant streams 16A, 16B within at least one of the anode and cathode flow fields 26, 36 to be greater than 1.00 until the power output of the fuel cell 20 reaches about seventy-five percent of the maximum power output of the fuel cell 20. While the relative humidity of the reactant streams 16A, 16B is greater than 1.00, water produced by the fuel cell 20 moves into the available volume in the water reservoir 18A, 18B, and any excess water 14 is removed from the fuel cell 20 within the cathode exhaust stream exiting the cathode exhaust 42. As the fuel cell 20 power output increases to between about eighty percent and one-hundred percent of a predetermined fuel cell maximum potential power output, the temperature within the fuel cell 20 increases and the relative humidity therefore decreases so that water 14 held in the water reservoir 18A, 18B evaporates into the reactant streams 16A, 16B.

The water reservoir 18A, 18B may also define an adequate water-retention volume to retain sufficient water for maintaining the relative humidity of the reactant streams 16A, 16B at or about 1.00 during anticipated high power demands placed on the fuel cell 20. A particular fuel cell 20, such as a fuel cell for a transportation vehicle (not shown), or a fuel cell for a stationary power plant (not shown), will have a predictable, predetermined duration of a high-power output. The water holding volume defined by the water reservoir 18A, 18B is dimensioned to retain an adequate volume of water 14 to maintain the relative humidity of the reactant streams 16A, 16B at or about 1.00 during such predetermined durations of a high-power output. A preferred water holding volume defined by the water reservoir 18A, 18B is an adequate volume to maintain the relative humidity of the reactant streams at or about 1.00 for about five minutes. After the predetermined duration of high power output, such as the five minute duration, the control system may initiate a de-rate function to return the fuel cell to operating at less than about seventy-five percent (75%) of the maximum power output of the fuel cell.

Figure 2:
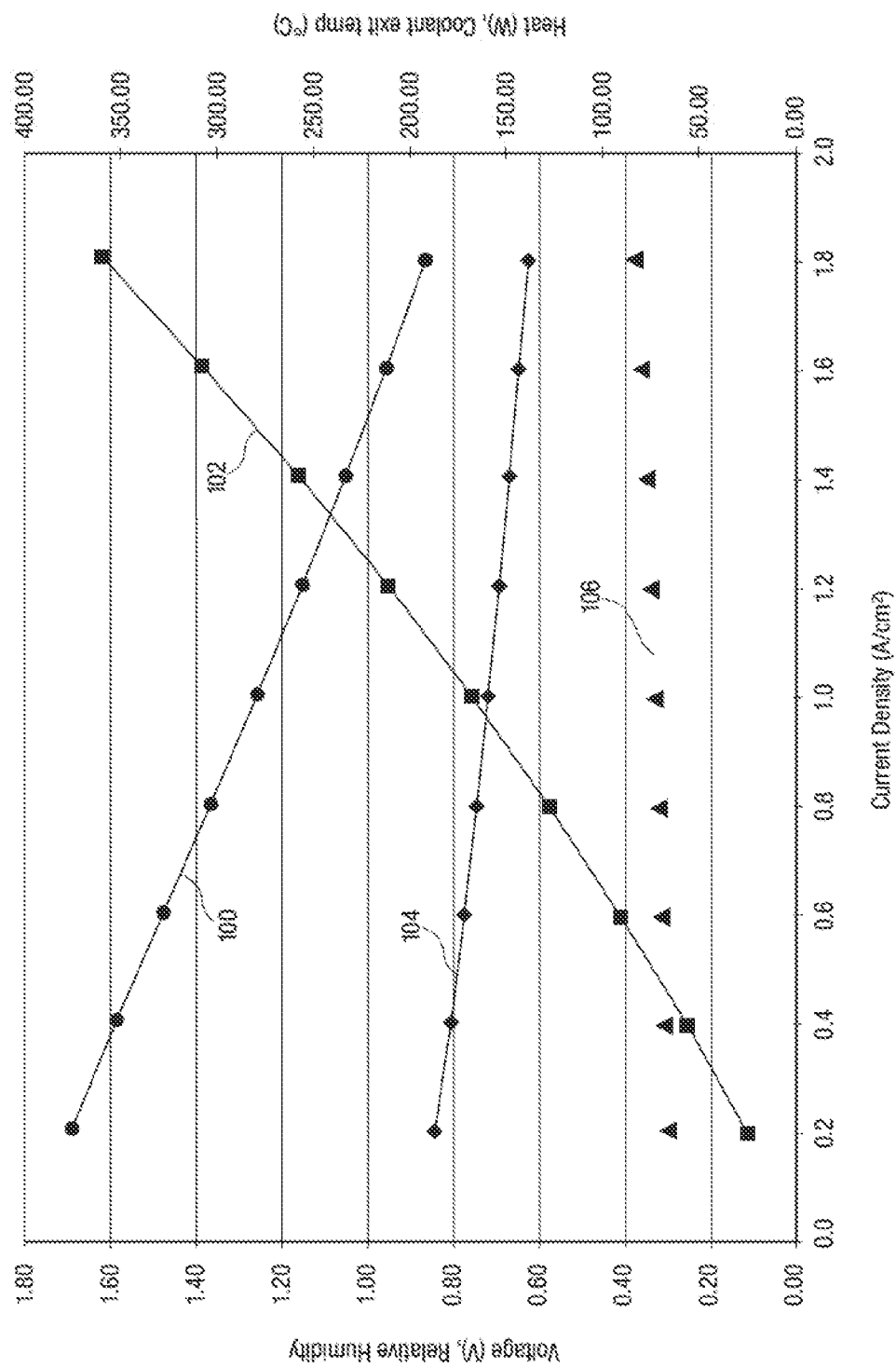
FIG. 2 is a graph showing relative humidity of a reactant stream exiting a fuel cell as a function of voltage, current density and heat.
Figure 3:
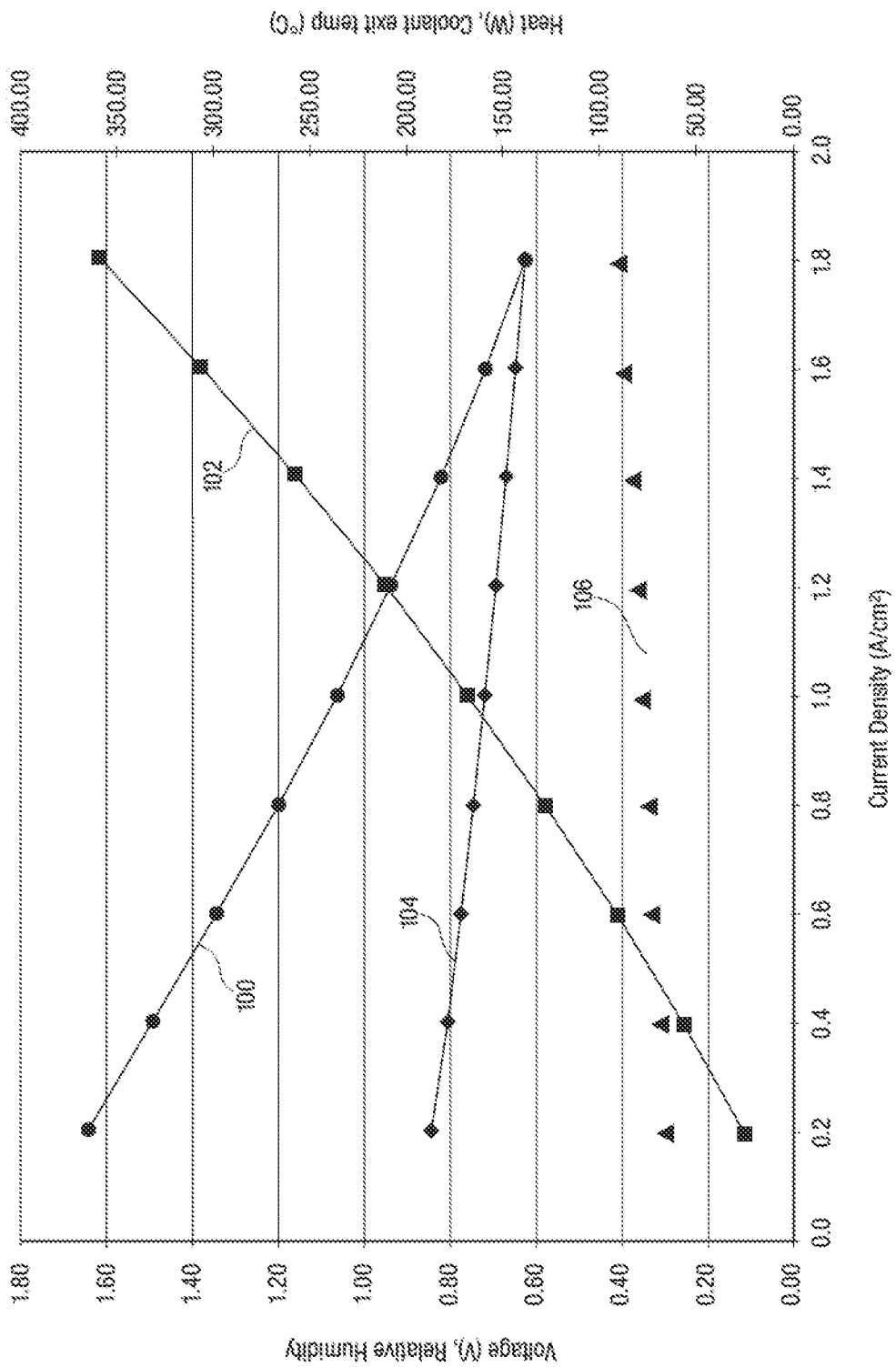
FIG. 3 is a graph showing a change in the relative humidity of the reactant stream of the FIG. 2 graph in response to an increase in operating temperature of a fuel cell.

FIG. 2 presents a simulated polarization curve on a graph that shows a change in relative humidity of a cathode stream exiting a fuel cell in response to increasing current density. The fuel cell performance simulated in FIG. 2 yields the heat generation rate in FIG. 2 for a three hundred and twenty square centimeter PEM with a fixed temperature of sixty-five degrees Celsius of a coolant fluid passing through a sealed coolant flow field adjacent the simulated fuel cell cathode flow field. The relative humidity at steady state is represented by plot line 100; the fuel cell heat is represented by plot line 102; the fuel cell voltage is represented by plot line 104; the temperature of the coolant fluid at the coolant outlet is represented by plot line 106. FIG. 2 shows that the relative humidity of the reactant stream remains above 1.0 at a current density (as shown on the horizontal axis) of about 1.5 amps per square centimeter ("A/cm$^2$"). The relative humidity then declines below 1.0 at a current density greater than 1.5 A/cm$^2$. As described above, when the relative humidity of the reactant stream falls below a 1.0 whenever the fuel cell is operated at current densities above 1.5 A/cm$^2$, water evaporates out of the fuel cell giving rise to decreased hydration of the PEM resulting in decreased fuel cell performance and harmful hydration cycling of the PEM FIG. 3 shows the same plot lines described in FIG. 2 for a simulated fuel cell performance wherein the flow of the coolant fluid through the sealed coolant flow field is divided by 1.5 so that the flow rate is approximately two-thirds of the flow rate shown in FIG. 2. This causes an increase in the temperature in the coolant fluid leaving the fuel cell, and more importantly causes the relative humidity, shown in plot line 100 in FIG. 3, to decline below 1.0 at about 1.1 A/cm$^2$. Therefore, the fuel cell performance shown in FIG. 3 demonstrates that controlling coolant fluid temperature by changing coolant fluid flow rates is one of several ways that may be utilized by the present relative-humidity controller 62 to maintain a relative humidity of reactant streams passing through a fuel cell at or above 1.0 as the current density or power output of the fuel cell increases to exceed eighty percent of a maximum current output of the fuel cell.

The present disclosure also includes methods of operating the sealed coolant flow field fuel cell power plant 12 to maintain efficient relative humidity of reactant streams 16A, 16B passing through the fuel cell 20. A method of so operating the fuel cell power plant 12 includes controlling at least one of: a pressure of the reactant streams 16A, 16B within the anode flow field 28 and/or the cathode flow field 36; a flow rate of the reactant streams 16A, 16B flowing through the anode flow field 28 and/or the cathode flow field 36; a temperature of the coolant fluid in the sealed coolant flow field 44; a flow rate of the coolant fluid passing through the sealed coolant flow field 44; so that water 14 moves from the water reservoir 18A, 18B into the reactant stream 16A, 16B whenever power generated by the fuel cell 20 is between about eighty percent and about one-hundred percent of a maximum power output of the fuel cell 20, and so that water 14 moves from the reactant stream 16A, 16B into the water reservoir 18A, 18B whenever power produced by the fuel cell 20 is less than about seventy-five percent of the maximum power output of the fuel cell 20.

The method of operating the fuel cell power plant 12 may also include storing an adequate amount of water 14 in the water reservoir 18A, 18B for maintaining the relative humidity of the reactant streams 16A, 16B at about 1.00 during predetermined durations of a high-power output by the fuel cell 20. The storing of the adequate amount of water 14 may also include storing a volume of water 14 that is adequate to maintain a relative humidity of the reactant streams 16A, 16B at or about 1.0 during a five minute duration of high-power output by the fuel cell 20.

While the above disclosure has been presented with respect to the described and illustrated embodiments of the control system 10 for a sealed coolant flow field fuel cell power plant 12 it is to be understood that the disclosure is not to be limited to those alternatives and described embodiments. Accordingly, reference should be made primarily to the following claims rather than the forgoing description to determine the scope of the disclosure.

What is claimed is:

1. A control system of a fuel cell power plant configured to generate electrical current from an oxidant reactant stream and a hydrogen-rich fuel reactant stream, the control system comprising:
   at least one fuel cell including a membrane electrode assembly having a proton exchange membrane disposed between an anode catalyst surface and an opposed cathode catalyst surface of the assembly, an anode flow field defined in fluid communication with the anode catalyst surface and with a fuel inlet line to direct flow of the hydrogen-rich fuel reactant stream from the fuel inlet line adjacent the anode catalyst surface and out of the anode flow field through an anode exhaust as an anode exhaust stream, a cathode flow field defined in fluid communication with the cathode catalyst surface and with a source of the oxidant to direct flow of the oxidant reactant stream from an oxidant inlet line adjacent the cathode catalyst surface and out of the cathode flow field through a cathode exhaust as a cathode exhaust stream;
   a sealed coolant flow field secured in thermal exchange with one of the anode flow field and the cathode flow field for directing to direct a coolant fluid from a coolant inlet of a coolant loop, through the coolant flow field and through a coolant loop outlet, the coolant loop configured to control a temperature of the coolant fluid within the coolant flow field;
   at least one water reservoir secured in fluid communication with at least one of the anode flow field and the cathode flow field and secured in fluid isolation from the sealed coolant flow field, the water reservoir configured to move water from the reservoir and into the reactant stream located in the at least one of the anode and cathode flow fields, and to move water from the reactant stream located in the at least one of the anode and cathode flow fields and into the at least one reservoir; and,
   a relative-humidity controller secured in communication with the fuel cell and configured to selectively control at least one of a pressure of the reactant streams, a flow rate of the reactant streams, and a temperature of the coolant fluid within the sealed coolant flow field, so that water moves from the water reservoir into the reactant gas streams whenever power generated by the fuel cell is between about eighty percent and about one-hundred percent of a predetermined maximum power output of the fuel cell, and so that water moves from the reactant gas streams into the water reservoir whenever power produced by the fuel cell is less than about seventy-five percent of the predetermined maximum power output of the fuel cell.

2. The control system of claim 1 further comprising a relative-humidity sensor secured in communication with the reactant stream passing through the at least one of the anode flow field and the cathode flow field, and also secured in communication with the relative-humidity controller to communicate sensed information about the relative humidity of the reactant streams to the controller.

3. The control system of claim 2, wherein the relative-humidity sensor is secured in communication with the cathode exhaust.

4. The control system of claim 1 wherein the relative-humidity controller is also secured in communication with at least one of a fuel inlet valve secured to the fuel inlet line, an oxidant inlet valve secured to the oxidant inlet line, an oxidant blower-secured to the oxidant inlet line, an anode exhaust valve secured to the anode exhaust, a cathode exhaust valve secured to the cathode exhaust, and the coolant loop.

5. The control system of claim 1, wherein the water reservoir further comprises pores defined in at least one of a cathode porous body secured in fluid communication with the cathode catalyst surface of the membrane electrode assembly, and an anode porous body secured in fluid communication with the anode catalyst surface of the membrane electrode assembly.

6. The control system of claim 1, wherein the water reservoir defines a water-retention volume dimensioned to retain an adequate volume of water to maintain the relative humidity of the reactant streams at or about 1.00 during a predetermined duration of power output of the fuel cell that is between about eighty percent and about one-hundred percent of a predetermined maximum power output of the fuel cell.

7. The control system of claim 6, wherein the water reservoir defines a water-retention volume that is adequate to maintain a relative humidity of the reactant streams 16A, 16B at or about 1.0 whenever the predetermined duration of the power output of the fuel cell that is between about eighty percent and about one-hundred percent of a predetermined maximum power output of the fuel cell is about five minutes.

8. A method of operating a fuel cell power plant configured to generate electrical current from an oxidant reactant stream and a hydrogen-rich fuel reactant stream to control relative-humidity levels of reactant streams passing through the fuel cell, the fuel cell power plant having a control system according to claim 1, the method comprising:
   controlling at least one of: the pressure of the reactant streams; the flow rate of
   the reactant streams; the temperature of a the coolant fluid passing through the sealed coolant flow field; and a flow rate of the coolant;
   so that water moves from the water reservoir into at least one of the reactant streams whenever power generated by the fuel cell is between about eighty percent and about one-hundred percent of the predetermined maximum power output of the fuel cell, and so that water moves from the at least one of the reactant streams into the water reservoir whenever power produced by the fuel cell is less than about seventy-five percent of the predetermined maximum power output of the fuel cell.

9. The method of claim 8 further comprising, retaining an adequate volume of water within the water reservoir to maintain the relative-humidity of the at least one of the reactant streams at about 1.00 during a predetermined duration of power output of the fuel cell that is between about eighty percent and about one-hundred percent of a predetermined maximum power output of the fuel cell.

10. The method of claim 8, wherein the controlling so that water moves from the at least one of the reactant streams into the water reservoir comprises controlling water to move water into pores defined in at least one of a cathode porous body secured in fluid communication with a cathode catalyst surface of a membrane electrode assembly and an anode porous body secured in fluid communication with an anode catalyst surface of the membrane electrode assembly.

* * * * *